Figure 1:
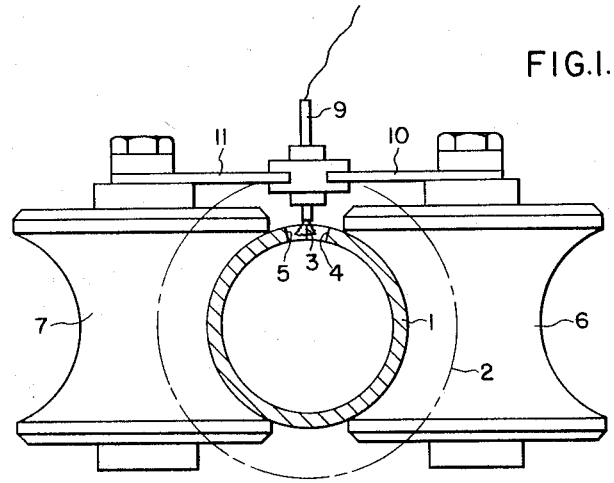

Dec. 27, 1966   H. SCHÄFER   3,294,928

METHOD AND APPARATUS FOR SEAM WELDING OF TUBES

Filed Dec. 30, 1964

WITNESSES
Theodore F. Krobel
James F. Young

INVENTOR
Hans Schäfer
BY

United States Patent Office 3,294,928
Patented Dec. 27, 1966

3,294,928
METHOD AND APPARATUS FOR SEAM
WELDING OF TUBES
Hans Schäfer, Erlangen, Germany, assignor to Siemens-Schuckertwerke Aktiengesellschaft, Erlangen, Germany, a corporation of Germany
Filed Dec. 30, 1964, Ser. No. 422,296
Claims priority, application Germany, Jan. 22, 1964, S 89,164
3 Claims. (Cl. 219—8.5)

The present invention relates to method and apparatus for seam welding of tubes, and more particularly, the invention concerns a procedure and apparatus for the seam welding of tubes by means of alternating current, and in which a strip of metal curved into cylindrical form is fed through heating-current-flow-causing means and is finally welded along the mating edges of the sheet by the high local current density of the induced alternating current.

Seams welded in the aforesaid manner by known procedures display irregularities in their strength. By means of this invention, it will be shown how it is possible to employ a simple technique to make homogeneous seam welds.

In accordance with the invention, this homogeneity is obtained by producing a fixed-position arc which establishes an electrically conducting current path between the opposing edges a short distance ahead of their meeting point.

The basis of the invention lies in the realization that the irregularities in the seam weld are caused by the relative velocity between the point being welded and the tube which is moving in its axial direction not being constant. Because of small fluctuations in the width of the sheet-metal strip from which the tube is made, and because of burrs on the edges, contact between the converging edges will sometimes occur sooner and sometimes later. Thus the welding location wanders back and forth with respect to the position of the pressure-rollers. As a result, many locations of the tube become more strongly heated and others less so. By making use of the arc, which is located ahead of the point where the slit terminates and the edges join, a locally fixed "contact" point is established between the edges; the said "contact" point giving rise, in effect, to a constant relative velocity between the welding location and the tube. This arc "contact," where the greatest heat is developed, should be located ahead of the slit termination, so that no arbitrary (random) junctions can form between the edges before arriving at such arc.

The arc has yet another beneficial action. It causes additional thermal energy to be conveyed to the workpiece, so that with a preset generator loading of the heating-current-flow-causing means, it is possible to increase the rate of travel of the tube.

The arc can be so produced in a way which makes it possible to locate an arc electrode over the seam weld at a place specified with respect to the pressure-rolls where the edges are pressed together, and the tube itself can be used as a return-line for the arc current. Decoupling of the arc's D.C. circuit from the A.C. circuit of the inductor is obtained by using a choke in the D.C. circuit.

Figure 2:
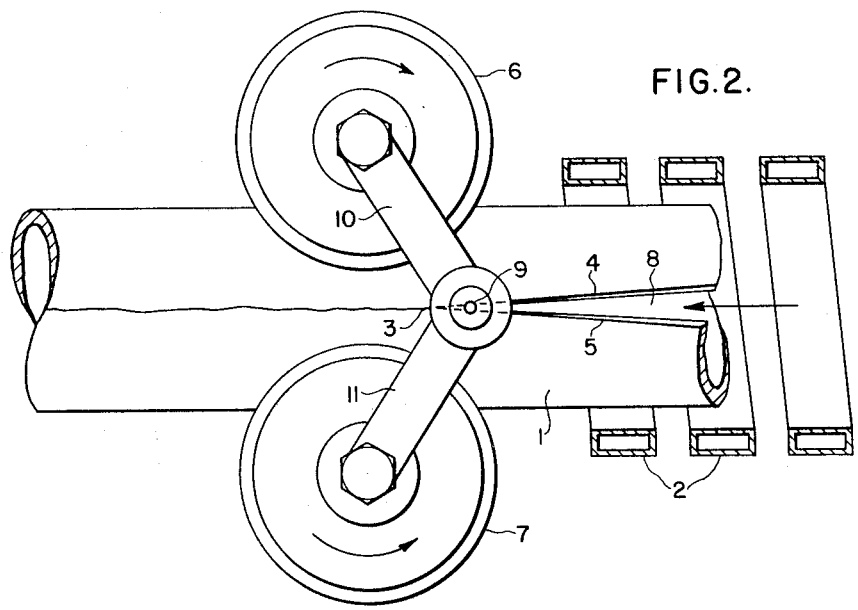

Using the constructional example shown in FIGS. 1 and 2, a metal strip 1 bent into cylindrical shape is fed through an induction coil 2 consisting of three turns, as the heating-current-flow-causing means. The said coil is connected to a high frequency generator. A high frequency current is induced in the bent metal strip which flows along its edges 4 and 5 and so heats the material that it melts at meeting point 3 of the such edges. In conventional set-ups, the current flows between the edges at the meeting point, and this point tends to wander to and fro relative to pressure rollers 6 and 7 on account of unevennesses in the direction of travel of the tube. This wandering is inhibited by means of arc electrode 9 located close to the end of gap 8. By means of lever arms 10 and 11, the arc electrode is located in a specified position relative to the pressure rollers and ensures that the transfer of current between the converging edges takes place via the arc. The location where the two edges first meet, and hence the place where the greatest heating occurs, is thereby locally stabilized, so that, with constant travel velocity of the tube, there will also be a constant relative velocity between the tube and the welding point. The electrical circuit employed for producing the arc is not shown in the illustrations. The said circuit can be constructed in accordance with the type described above.

I claim as my invention:

1. A method for the seam welding of tubes by means of alternating current, comprising the steps of continuously forming metal strip into cylindrical form by longitudinal advancement while converging opposing edges of such strip to a point of meeting at a longitudinal position susceptible to variance due to irregularities in the surface of such edges, producing an electrically conducting arc between such edges by localized discharge from an electrode at a fixed logitudinal position immediately before said point of meeting, and causing alternating current to flow along such edges in advance of and by way of said electrically conducting arc to obtain welding of said edges together at their point of meeting.

2. In apparatus for the seam welding of tubes, the combination of pressure rolls between which continuously converging edges of longitudinally advancing metal strip are brought to a point of meeting at the terminus of a gap between such edges, an electrode at a fixed position relative to said pressure rolls for establishing a direct current arc across said gap immediately in advance of its terminus, and a helical induction coil positioned in advance of said electrode for encirclement of the advancing strip to cause flow of alternating heating current along said converging edges and therebetween via said arc.

3. In a continuous seam welding method, the steps of continuously converging edges of metal strip by longitudinal advancement to form a gap therebetween having a terminus at a meeting point of such edges, producing an arc between such edges and across said gap immediately in advance of such terminus, and causing high frequency heating current to flow along such edges in advance of and by way of said arc, the producing of said arc being independent of the causing of high frequency heating current flow.

References Cited by the Examiner
UNITED STATES PATENTS

| 2,669,639 | 2/1954 | Bowman | 219—8.5 |
| 2,774,857 | 12/1856 | Rudd et al. | 219—67 |
| 2,784,349 | 3/1957 | Anderson | 219—135 X |
| 2,800,561 | 7/1957 | Shenk | 219—8.5 |
| 2,905,805 | 9/1959 | McElrath et al. | 219—61 X |

References Cited by the Applicant
UNITED STATES PATENTS 3,146,336   8/1964   Whitacre.

JOSEPH V. TRUHE, Primary Examiner.